March 26, 1968     W. G. U. AYE ET AL     3,375,424
CONTROL CIRCUIT FOR INDUCTION MOTORS
Filed July 14, 1965     3 Sheets-Sheet 1

INVENTOR
W.G.U. AYE    M.J. BALKOW
H.K.H. HASSE    G.J. RAUTER

BY

ATTORNEY

INVENTOR
W. G. U. AYE  M. J. BALKOW
H. K. H. HASSE  G. J. RAUTER

BY *R. P. Morris*

ATTORNEY

INVENTOR
W.G.U. AYE   M J BALKOW
H.K.H HASSE   G J RAUTER

BY

ATTORNEY

United States Patent Office 3,375,424
Patented Mar. 26, 1968

3,375,424
CONTROL CIRCUIT FOR INDUCTION MOTORS
Wolfgang Gerhard Ulrich Aye, Nurnberg, Max Joachim Balkow, Feucht, near Nurnberg, Hans Karl Hermann Hasse, Nurnberg, and Gunter Josef Rauter, Ruhstorf (Rott), Germany, assignors to International Standard Electric Corporation, New York, N.Y., a corporation of Delaware
Filed July 14, 1965, Ser. No. 471,925
Claims priority, application Germany, July 17, 1964, St 22,423
8 Claims. (Cl. 318—227)

ABSTRACT OF THE DISCLOSURE

Control circuit for enabling selective rotational speed and direction variations in induction motors. The control circuit uses controlled rectifier switching to alter the frequency of applied voltage to change the speed. A feedback circuit is used to regulate the adjusted speed to compensate for differences in speed regulations caused by the resistance in the rotor circuitry.

---

The present invention relates to the regulation of induction (asynchronous) motors employing resistance rotors, and more particularly to circuit arrangements for effecting the speed regulation of such motors.

In many technical fields motors are required which are supposed to run at different speeds, especially at different constant speeds. Thus, for example, in the case of washing machines there is required a motor which, during the wash cycle, runs at a constant low speed, and is reversed during this cycle if so required, and which, on the other hand, runs at a high speed during the spin cycle.

In view of their advantages, induction motors are being satisfactorily employed for many purposes. In such types of motors, however, the speed regulation is encountered by certain difficulties. The torque characteristic of induction motors, as a rule, has a distinct pull-out torque and/or a backfall torque, so that stable operating conditions do not exist within the speed range of the motor under varying load conditions. The regulation of induction motors by changing the supply voltage, however, is only possible if the motor is designed to minimize pull-out torque. In particular, this is possible since the conductor rods which are arranged along the circumference of the rotor, are insulated with respect to the rotor plates, but, on the other hand, are electrically connected to each other, for example, via short-circuiting rings. On account of this, shunt currents are prevented from flowing through the plates of the rotor.

With respect to its speed, induction motors can be regulated throughout the entire turning range, by varying the frequency of the supply voltage. According to the invention this regulation is effected with the aid of controllable semiconductor devices. The ability to regulate induction motors at many different speed settings enables such motors to be used for many applications in which a speed regulation at different speed settings is necessary, so that the advantageous properties of these motors can be applied in new fields. Regulation with the aid of controllable semiconductor rectifiers is particularly advantageous, inasfar as this regulation is performed in a lossless manner.

Therefore, an object of the invention is to provide circuitry for varying the speed of induction motors and for regulating the inductor motors at the different speed settings.

According to an embodiment of the invention, the induction motor is connected with its auxiliary phase, via a capacitor, to the A.C. supply voltage, and the frequency of the voltage at the operating windings is varied with the aid of controllable semiconductor rectifiers.

This is effected in such a way that the operating or working phase is connected to the A.C. side of a rectifier bridge circuit, in the D.C. circuit of which there is arranged a controllable semiconductor rectifier. The blocking/unblocking ratio of this controllable semiconductor rectifier is varied with the aid of suitable switching manipulations so that the frequency of the applied voltage is controllable.

Further details of the control will now be explained with reference to the copending drawings in which.

Figure 1:
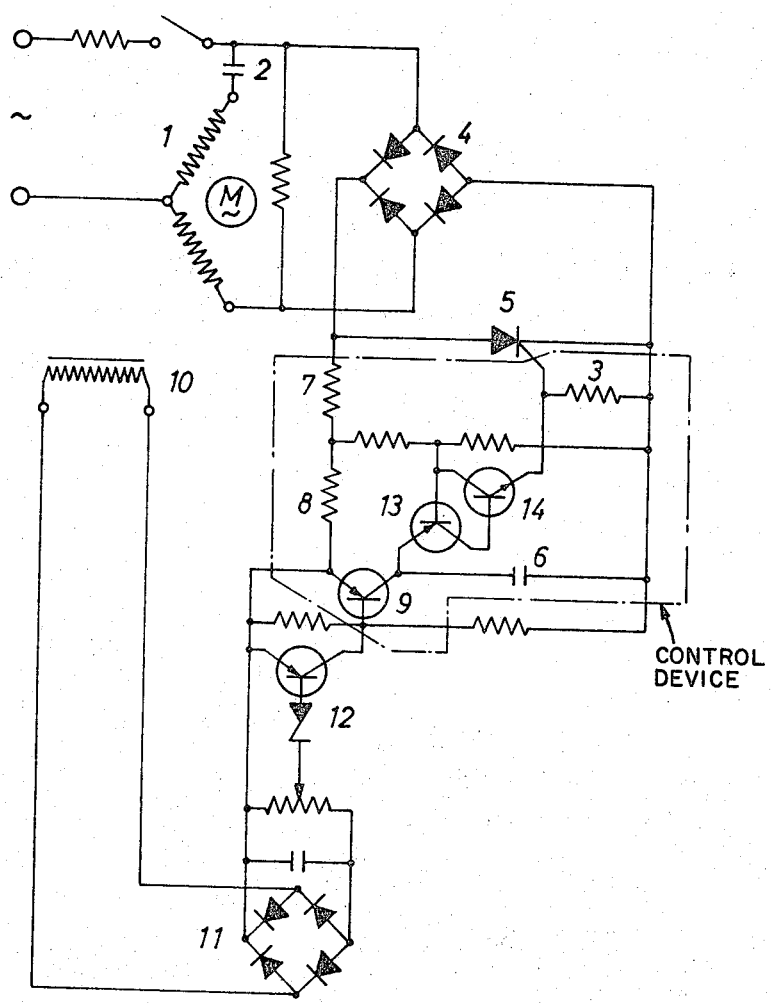
FIG. 1 shows a circuit arrangement of a single-phase induction motor with a circuit arrangement for controlling the speed with the aid of a controllable semiconductor rectifier.

In the circuit arrangement according to FIG. 1, the reference numeral 1 indicates the stator windings of a single-phase induction motor. Reference numeral 2 indicates the capacitor which is used for producing the starting or auxiliary phase. The motor, which is so embodied as to comprise no pull-out torque, is connected with its operating or working winding to the rectifier bridge circuit 4, i.e., to the A.C. side thereof. The D.C. side of the rectifier bridge circuit 4 is connected to a controllable semiconductor rectifier such as SCR5. This controllable semiconductor rectifier is periodically switched into the conductive state. The variation of the conducting times effects a speed adjustment of the motor since it changes the frequency of the applied voltage according to the well known equation $$S = \frac{120f}{P}$$

where S is equal to the rotational speed of the motor, $f$ is equal to the frequency of the applied voltage and P is equal to the number of poles per phase. The control circuit for the controllable rectifier or SCR5 consists of a combination of resistors, transistors, and capacitors, which pulse controls the SCR5. Via the rectifier bridge circuit 4, the start winding 1a receives a pulsating D.C. voltage. The capacitor 6 is charged across the resistors 7 and 8, and the emitter-collector circuit of the transistor 9. The transistor 9, in this case, represents a variable resistor controlling the charging of the capacitor 6. This transistor 9 may also be replaced by any other variable type of resistor, as will be explained hereinafter. The transistor 9 is controlled via the Zener diode 12, the rectifier bridge 11, and the tachometer 10. The time constant of the capacitor circuit is dependent upon the degree to which the transistor is controlled. The time constant controls the time in which the transistor 13 becomes unblocked. After this transistor has unblocked, the transistor 14 will likewise become unblocked, and the capacitor 6 is discharged across resistor 3 thereby applying a pulse at the control electrode of the controllable rectifier 5, switching it to the conductive state.

In this way there is effected the readjustment of the frequency of the voltage at the operating or working phase of the single-phase induction motor. The resulting speed is measured by tachometer 10 and is compared in this closed regulating circuit with the rated voltage as constituted by the Zener diode 12, and is fed to the emitter of transistor 9.

In this circuit arrangement, in the completely controlled state of the controllable rectifier, only one supply voltage is available for the control circuit, corresponding to the voltage drop at the controllable rectifier, and the rectifiers of the bridge circuit in the forward direction. This voltage which is still reduced by the voltage dividers necessary for other reasons, is then no longer sufficient for switching over the controllable rectifier from the non-conducting to the conducting state. Accordingly, it is not possible to perform a complete modulation in this circuit arrangement. This means that care has to be taken to prevent the controllable rectifier from becoming conductive during the entire half-wave, and to assure that the rectifier will still remain blocked for a certain period of time at the beginning of the half-wave. During this time that particular supply voltage which is necessary for supplying the control circuit is applied to the controllable rectifier. No voltage is applied to the load during this time, so that in the event of the greatest possible modulation never the entire mains voltage can appear at the load.

Figure 2:
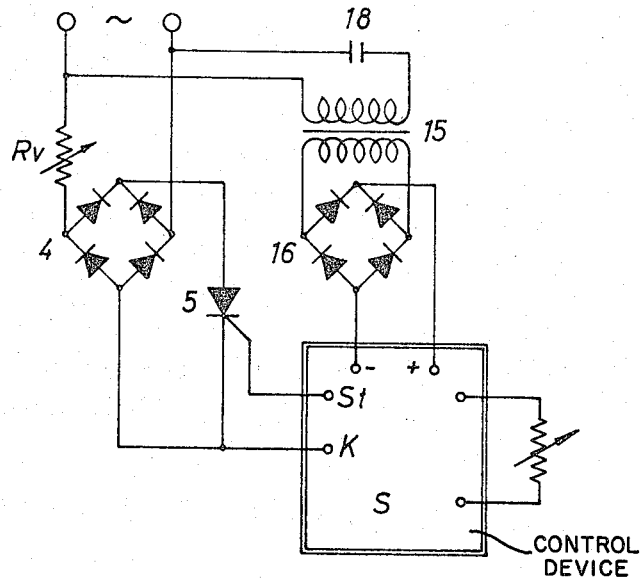
FIG. 2 shows a modification of the control circuit.

Buffering the load from the mains can be accomplished in that the control voltage is taken from a transformer connected to the mains. The secondary voltage is rectified by a bridge rectifier, but not smoothed and, is fed to the control circuit. This circuit arrangement is shown in FIG. 2. The control device S is operated from the alternating current mains via a transformer 15 and a rectifier 16, and controls, in turn, the controllable rectifier 5.

Figure 2A:
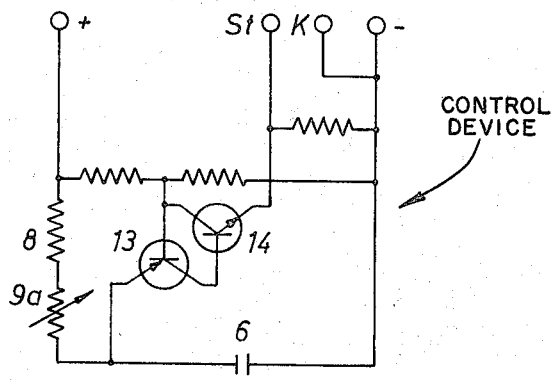
FIG. 2a shows the circuit arrangement of the control device of FIG. 2.

The circuit arrangement of the control device itself is shown in FIG. 2a, wherein the same reference numerals are used as in FIG. 1.

By using the circuitry of FIG. 2, the control voltage is independent of the degree of modulation of the controllable rectifier, so that also in the case of a complete modulation, a sufficiently high supply voltage will be available. On account of this it is possible to vary the load voltage throughout the range from zero up to its full value.

In this circuit arrangement the control voltage is shifted by the power factor cos $\varphi$ of the auxiliary transformer 15. In order to avoid this disadvantage a suitable capacitance 18 may be arranged in series with the primary winding of the auxiliary transformer 15.

If the supply voltage is directly parallel to the controllable rectifier, the state of complete modulation can be achieved in that one or more resistors are connected in series with the controllable rectifier. As such resistors there are preferably used semiconductor types of rectifiers, such as silicon diodes, which are connected in the forward direction. Thus, in the case of a complete modulation of the controllable rectifier, the voltage available for the control circuit amounts to the sum of the forward voltage drops of the series-connected resistors including the controllable rectifier. This voltage must be chosen thus that the supply voltage of the control circuit necessary for priming the controllable rectifier, is just achieved.

For example, instead of the resistor in the emitter-collector circuit of transistor 9, FIG. 1, it is also possible to use a temperature-dependent resistor, or else a light-sensitive resistor whose resistance value varies in dependence upon either the luminous intensity or the wavelength of the incoming light.

By way of adding a capacitor it is also possible to change the timely behaviour of the control circuit, so that, for example, in the event of a certain variation of the input quantity the controllable rectifier will be modulated gradually.

With the aid of such a circuit arrangement the speed of the motor can be readjusted either manually, or in dependence upon an actual value. This value may be obtained in various ways.

For example, it is possible to arrange in the motor permanent magnets rotating together with the rotor. In a suitably arranged coil these magnets are e.g. capable of inducing in the motor a voltage which is converted into a control voltage proportional to the motor speed.

On the other hand, it is also possible to use permanent magnets rotating with the armature, for switching-on the contacts. Particularly suitable to this end are hermetically sealed contacts which are known to be employed for other purposes. By the action of the contact a source of direct current is switched-on and -off the quicker the higher the motor speed is. Hence, the switching frequency is in proportion to the speed of rotation of the motor. By employing a frequency-dependent resistor it is possible to form therefrom a voltage varying with the speed of rotation.

Figure 3:
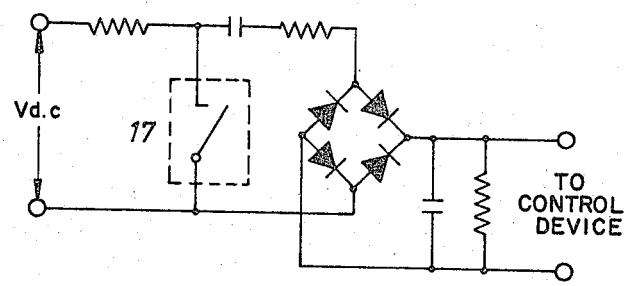
FIGS. 3 and 4 show further circuit arrangements representing modifications of the control employing controllable rectifiers.

FIG. 3 shows a circuit arrangement illustrating how, with the aid of a contact 17 actuated by permanent magnets, a corresponding control voltage can be obtained from a source of direct current.

Moreover, it is also possible to provide an additional motor winding delivering an alternating current voltage which is in proportion to the speed of rotation of the motor, with this A.C. voltage being rectified, and fed to the control circuit of the arrangement.

Finally, the armature voltage may be led out via collector rings, and the amplitude of the armature voltage as well as the slip frequency can be used as the actual-value quantity.

In the case of single-phase motors an auxiliary phase is required for producing the rotating field, to which there is fed a voltage whose phase is shifted with respect to the mains by the action of a capacitance. This capacitance may be the capacitor 2 shown in FIG. 1. The voltage at this capacitor is dependent upon the speed of the motor. Likewise, the voltage at this capacitor may be used for obtaining a D.C. voltage which is in proportion to the motor speed. It is also possible to use Hall generators to this end. The Hall generator, for example, may be arranged near the permanent magnets rotating with the armature. This Hall generator will then deliver a voltage whose amplitude is independent of the motor speed, whose frequency, however, is in proportion to the speed of the motor.

However, it is also possible to obtain a voltage which is dependent upon the motor speed, provided that the Hall generator is accommodated at such a point of the armature core plates (stampings) where the magnetic flux varies in dependence upon the motor speed.

Figure 4:
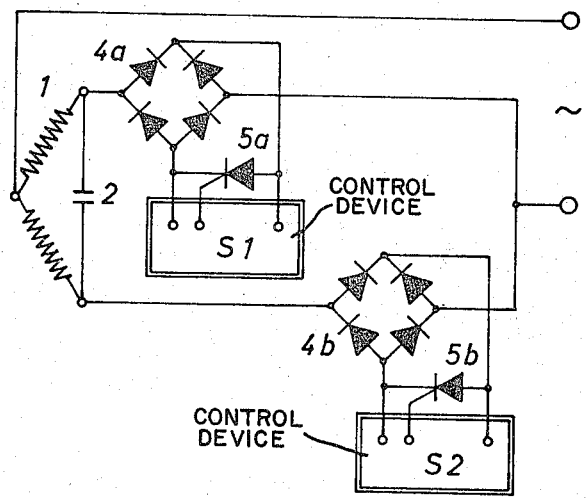

With the aid of the control according to the invention it is also possible to reverse the direction of rotation of the motor and, at the same time, to readjust the motor speed in either direction. A corresponding circuit arrangement is shown in FIG. 4. As can be recognized therefrom, there are used two control circuits of the same type comprising controllable rectifiers. In this case, however, it must be safeguarded that both circuits are locked with respect to each other, in order to avoid a short-circuit.

Instead of the two transistors 13 and 14 of which the one is of the pnp-type, and of which the other one is of the npn-type, it is also possible to use a four-layer diode or unijunction transistor.

In the hitherto described types of circuit arrangements the controllable rectifier is only made conductive at a time position in which the sinusoidal voltage as coming from the mains has already reached a predetermined value. This means to imply that the current will only start to flow after the voltage has already been applied for a certain time. Accordingly, there exists a phase shift between the current and the voltage which, in some cases is of disadvantage.

Instead of the controllable rectifier of the type described hereinbefore, it is also possible to use a component which, upon application of a pulse, can be reversed from the blocked to the unblocked condition as well as from the unblocked into the blocked condition. With the aid of such a component it is possible to avoid the phase shift which is due to the control arrangement.

Finally, there are also known controllable semiconductor devices which are capable of conducting high currents in both directions. Such types of components, as a rule, comprise two control electrodes with the aid of which, by the application of suitable pulses, either the one or the other direction of current flow can be released. When using such a type of component instead of the controllable rectifier 5, it is possible to do without the rectifier bridge circuit 4 (FIG. 1).

It is still to be pointed out that the invention is not only suitable for employment with single-phase motors, but that it, analogously, may also be employed with poly-phase motors.

While the principles of the invention have been described above in connection with specific apparatus and applications, it is to be understood that this description is made only by way of example and not as a limitation on the scope of the invention.

What is claimed is:

1. A speed control circuit for induction motors that comprises resistance rotor and stator winding means, said circuit comprising first rectifier bridge means connected to an alternating current power source, means for connecting said stator winding means in series between said power source and said first rectifier bridge means, controllable semiconductor rectifier means connected across the direct current side of said first bridge rectifier means, control means for controlling the ratio of conducting time to the non-conducting time of said controllable semiconductor rectifier means, said control means comprising alternating current signal producing means operated as a function of the speed of said motor, second rectifier means for converting said alternating current signals to D.C. signals, means for comparing said D.C. signals to the D.C. signals derived from said first bridge rectifier means, and means responsive to variations in said D.C. signals for operating said controllable semiconductor rectifier means to conduct and enable current pulses to pass through said stator winding means, the shape of said pulses determined by the conducting time of said controllable semiconductor rectifier.

2. The speed control circuit of claim 1 wherein said means responsive to the variations in said D.C. signals comprises timing capacitor means and variable resistor means in series with said timing capacitor means to provide a variable charging time constant.

3. The circuit arrangement according to claim 2 wherein the variable resistor comprises the emitter-collector circuit of a first transistor.

4. A circuit arrangement according to claim 3 wherein said alternating current signal producing means comprises tachometer means.

5. A circuit arrangement according to claim 4 wherein said alternating current signal producing means comprise contacts periodically closed responsive to rotation of said rotor, direct current source means connected to said contacts whereby said alternating current producing means provides direct current pulses which are in proportion to the speed of rotation of the motor.

6. The speed control circuit of claim 3 including transformer means coupled to the alternating current power source, and rectifier means connected to said transformer means to provide D.C. power to said control means.

7. The control circuit of claim 6 wherein said controllable semiconductor rectifier comprises control electrode means, and wherein said comparing means comprises bridged capacitor rheostat means connected across the D.C. side of said second bridge means, zener diode means connected to the wiper of said rheostat for providing an adjustable standard signal for the comparison, second transistor means operated responsive to differences in said D.C. signals to vary the variable resistance of said first transistor means, discharge resistor means coupled to said control electrode means, normally blocked transistor means coupled between said timing capacitor and said discharge resistor at the junction with said control electrode means, means responsive to the resistance variation in said first transistor for unblocking said normally blocked transistor means to discharge said timing capacitor through said discharge resistor, means responsive to said discharge for causing said controllable semiconductor rectifier to conduct and thereby enable current flow through said stator means which current is controlled responsive to the selected speed of said motor.

8. A circuit arrangement according to claim 1 characterized in this that in the operating phase there are arranged two control circuits with opposite polarity, which are locked with respect to one another to provide motor reversion and motor speed control.

References Cited

UNITED STATES PATENTS

| 3,183,425 | 5/1965 | Slawson | 318—227 |
| 3,252,067 | 5/1966 | Derenbecher | 318—227 XR |
| 3,262,034 | 7/1966 | Thoresen | 318—227 XR |
| 3,265,948 | 8/1966 | Sones et al. | 318—227 |

ORIS L. RADER, *Primary Examiner.*

G. Z. RUBINSON, *Assistant Examiner.*